Nov. 26, 1940.    C. C. FARMER    2,223,032
BRAKE VALVE DEVICE
Filed Jan. 28, 1938    2 Sheets-Sheet 1
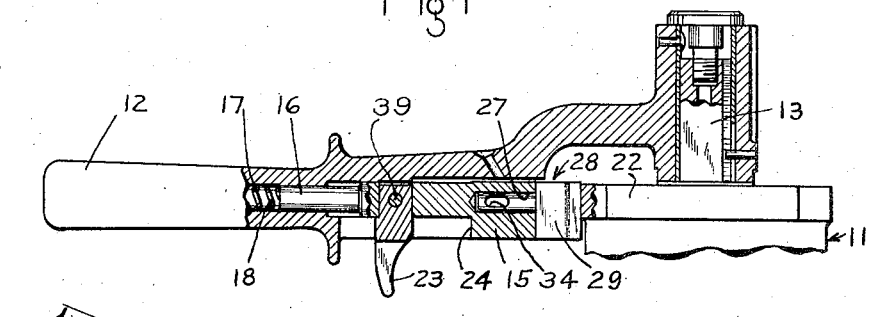
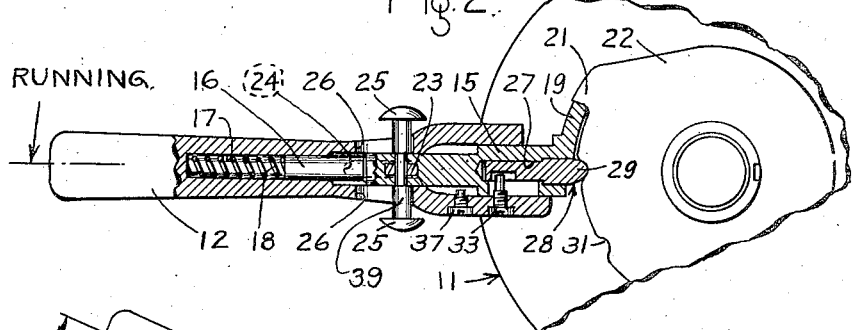
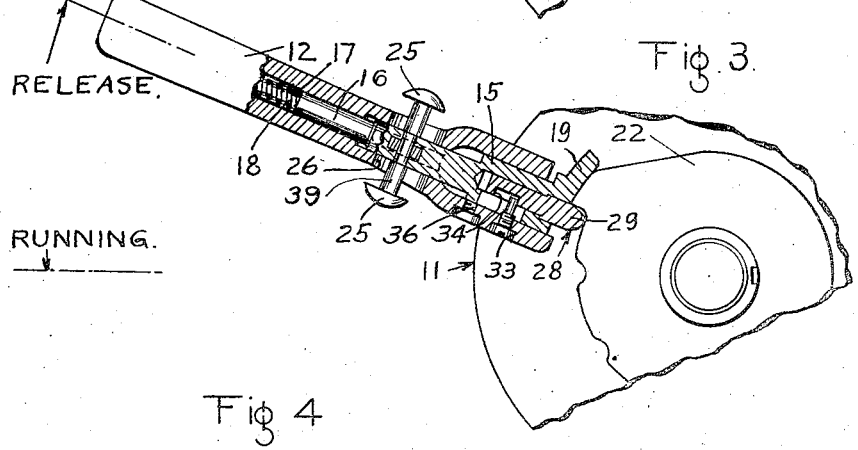
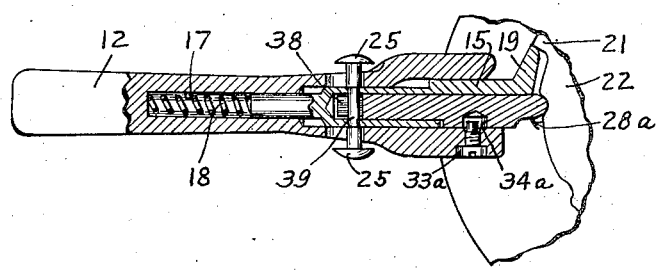
INVENTOR
CLYDE C. FARMER
BY
ATTORNEY Nov. 26, 1940.   C. C. FARMER   2,223,032
BRAKE VALVE DEVICE
Filed Jan. 28, 1938   2 Sheets-Sheet 2
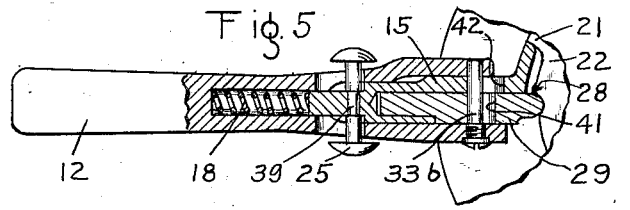
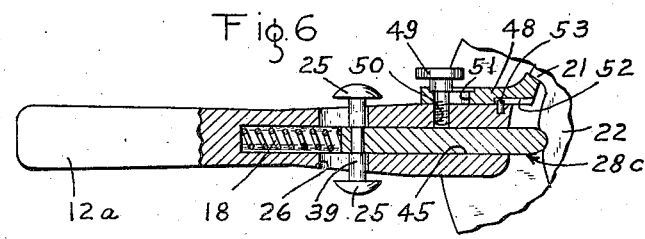
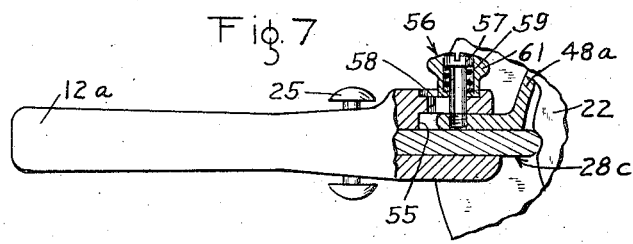
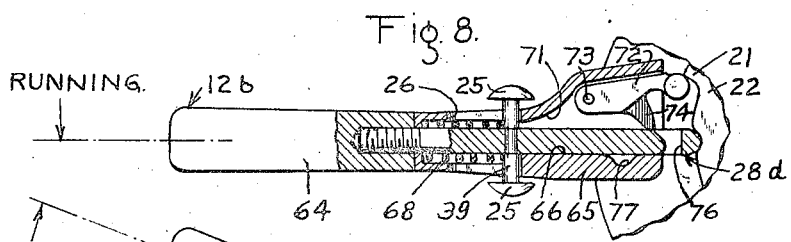
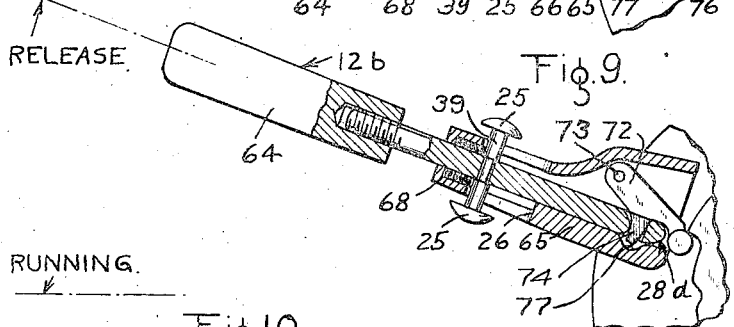
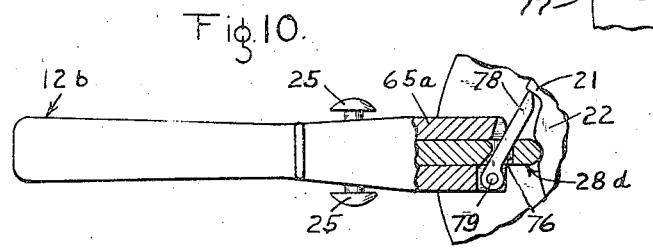
INVENTOR
CLYDE C. FARMER
BY
ATTORNEY Patented Nov. 26, 1940

2,223,032

UNITED STATES PATENT OFFICE 2,223,032

BRAKE VALVE DEVICE

Clyde C. Farmer, Pittsburgh, Pa., assignor to The Westinghouse Air Brake Company, Wilmerding, Pa., a corporation of Pennsylvania Application January 28, 1938, Serial No. 187,386

14 Claims. (Cl. 251—153)

This invention relates to brake valve devices and particularly to automatic brake valves of the type having a normal "running" position of the brake valve handle and a "release and recharge" position of the handle.

In a fluid pressure brake equipment, such as the familiar Westinghouse No. 6ET locomotive brake equipment described in Instruction Pamphlet No. 5032 (November 1932) published by The Westinghouse Air Brake Company, the automatic brake valve is so constructed that when the operating handle thereof is shifted to "release and recharge" position, hereinafter termed merely "release" position, the brake pipe running throughout the train is recharged directly from the main reservoir to effect the release of the brakes on the cars without effecting release of the brakes on the locomotive. In order to effect the release of the brakes on the locomotive by means of the automatic brake valve, the operating handle of the automatic brake valve must be shifted to the so-called "running" position thereof.

In the case of the early types of automatic brake equipments, the release position of the automatic brake valve is useful in that it enables (a) rapid initial charging of long freight trains, (b) rapid release of triple valves due to the rapid rate of pressure rise in the brake pipe, (c) recharge of the brake equipment during cycling operation upon descending grades, and (d) release of front-end brakes that have been stuck or reapplied due to overcharge.

For many years the release position of the automatic brake valve was considered indispensable to the satisfactory operation of the brake equipment. During recent years, however, there has been considerable improvement in the design and in the operating characteristics of the automatic brake equipment to such an extent as to almost completely negative the value of the release position. Among those factors which in recent years have tended to negative the value of the release position on the automatic brake valve are (1) higher capacity feed valves which have a much larger margin for dependable performance in service, (2) the introduction of "quick recharge," "retarded recharge," and "release insuring" features in brake controlling triple valves, and (3) the increase in the blow-down time of retaining valves to a higher maximum time.

It has been urged by some that the release position of the automatic brake valve be eliminated altogether while at the same time others are of the opinion that it should be retained, as far as standard brake equipment for railroads is concerned.

In view of the fact that large numbers of automatic brake valves are in service, it is desirable to devise ways and means to convert present standard automatic brake valves, with a minimum of expense, so as to eliminate the release position of the brake valve handle or so as to render it available optionally by some additional act or effort on the part of the operator.

Accordingly, it is an object of my invention to effect the conversion of present-day standard automatic brake valves having a release position and a running position so as to positively prevent the operation of the brake valve handle to release position normally but, if desired, to permit operation of the brake valve handle to release position by the expenditure of additional effort or by an additional act of the operator.

It is desirable to minimize the cost of conversion and also to avoid removal of the automatic brake valve out of service and thus a further object of my invention is to effect the conversion of present standard automatic brake valve devices so as to eliminate the full release position thereof by means associated with the handle of the brake valve and not requiring any modification of the main or body portion of the brake valve.

Still more specifically, it is an object of my invention to provide means carried on a brake valve handle and under the control of the operator for optionally preventing or not preventing movement of the brake valve handle to release position.

The above objects, and other objects of my invention which will be made apparent hereinafter, are attained by means of a few illustrative embodiments of my invention which will be described subsequently and which are shown in the accompanying drawings, wherein Figs. 1, 2 and 3 are different views of one embodiment of my invention, a part of each being in section to show details of construction.

Figs. 4 and 5 are fragmentary views with parts thereof in section, showing two different modifications of the embodiment shown in Figs. 1, 2 and 3.

Figs. 6 and 7 are views, with parts thereof in section, showing two species of a second embodiment of my invention, Figs. 8 and 9 are fragmentary views, with parts thereof in section, showing a third embodiment of my invention, and Fig. 10 is a view showing a modification of the embodiment shown in Figs. 8 and 9.

Description of embodiment shown in Figs. 1, 2 and 3

Referring to Fig. 1, there is shown in fragmentary form a conventional automatic brake valve device 11 having an operating handle 12 adapted to be secured, removably or otherwise, to the end of the operating shaft or stem 13 for the rotary valve (not shown) of the brake valve. According to my invention, the handle 12 is adapted to carry a slidable sleeve 15 having a stem 16 which is received in a suitable bore or recess 17 in the shank of the handle 12, a coil spring 18 being interposed between the bottom of the bore 17 and the end of the stem 16 to yieldingly urge the sleeve 15 in an axial direction parallel to the longitudinal axis of the handle. The sleeve 15 has a laterally extending portion or lug 19 adapted to engage the usual projecting shoulder 21 on the quadrant plate 22 of the brake valve 11 to prevent movement of the handle 12 out of running position toward and into release position.

A trigger 23, fixed to the stem 16 and projecting downwardly through a slot 24 in the underside of the handle, enables the operator to retract the sleeve 15 against the force of spring 18 by pulling on the trigger 23.

Carried in slidable relation in a bore 27 of the sleeve 15 is a pawl or latch 28 which is urged yieldingly into contact with the edge of the quadrant plate 22 by the spring 18 through the medium of the sleeve 15 which engages the enlarged head 29 of the latch or pawl 28.

The quadrant plate 22 is provided with recesses or notches 31 at spaced intervals along the edge thereof to define the various operating positions of the brake valve handle, and the latch 28 is shown in Figs. 1 and 2 as engaging in the notch defining the running position of the brake valve handle.

The usual feeler buttons 25, for indicating to the operator by sense of touch whether or not the latch 28 is engaged in the notches 31, are affixed on opposite sides of the stem 16 by a connecting pin 39 which projects through suitable slots 26 on the sides of the handle. Thus, if desired, the operator may employ the feeler buttons 25 to retract the sleeve 15 instead of the trigger 23.

In order to prevent the loss of the latch 28 from the handle 12 when the handle is removed from the brake valve, a screw 33 is provided in the body of the brake valve handle 12, the inner end of the screw extending into a slotted recess or groove 34 formed at the side of the stem portion of the latch 28.

According to my invention, the body of the handle 12 may be further provided with a tapped bore 36 for receiving a screw 37, the position of the bore 36 being such that when the screw 37 is fully screwed into the bore, the inner end of the screw acts as a stop to prevent retraction of the sleeve 15 by the trigger 23 or feeler buttons 25.

In operation, with the trigger 23 released, the shifting of the brake valve handle 12 in a clockwise direction as viewed in Fig. 2 beyond the running position toward the release position is prevented by the engagement of the projecting lug 19 on the sleeve 15 with the stop shoulder 21 on the quadrant plate 22.

If it is desired to prevent movement of the brake valve handle 12 to the release position at all times, the screw 37 is screwed into the bore 36, as shown in Fig. 2, so that the sleeve 15 carrying the lug 19 cannot be retracted. If it is desired to have the brake valve handle 12 optionally movable to the release position, the screw 37 is removed and thus the operator may, by pulling on the trigger 23 or the feeler buttons 25, retract the sleeve 15 to shift the projecting lug 19 out of line with the shoulder 21 on the quadrant plate 22, thus enabling the brake valve handle 12 to be shifted in a clockwise direction into the release position, as shown in Fig. 3.

The latch 28 is retracted along with the sleeve 15 but the inner end of the screw 33 serves as a stop to limit the degree of retractive movement of the latch 28 away from the quadrant plate 22. Thus, although the sleeve 15 is fully retracted, the latch 28 remains in a position to engage the stop shoulder 21 on the quadrant plate 22 and thereby prevent movement of the brake valve handle 12 in a clockwise direction beyond the release position.

When the brake valve handle 12 is shifted back to running position from the release position, the spring 18 snaps the sleeve 15 back to the position shown in Fig. 2 so that when the operator subsequently endeavors to return the brake valve handle from running position to release position, such movement is prevented.

A modified construction of the embodiment shown in Figs. 1, 2 and 3, is shown in Fig. 4, corresponding parts being designated by the same reference numerals as in Figs. 1, 2 and 3. In Fig. 4, the trigger 23 is omitted leaving the feeler buttons 25, which project on opposite sides of the handle and extend through the sleeve portion 15, to serve as the sole means to be grasped by the operator to effect the retraction of the sleeve member 15 and its lug 19 to enable movement of the handle 12 beyond running position to release position.

A latch 28a is provided which differs from the latch 28 in being longer and having a yoke portion 38 at the outer end thereof which straddles the connecting pin 39 of the feeler buttons 25. Thus, the latch 28a is yieldingly urged into contact with the edge of the quadrant plate 22 by the spring 18 through the medium of the sleeve member 15 and the pin 39 of the feeler buttons which pin bears against the outer end of the latch 28a. Since the pin 39 of the feeler buttons 25 bears directly on the end of the latch 28a, it will be apparent that the operator may know by sense of touch on the feeler buttons 25 when the latch 28a is engaged or not engaged in the notches 31 on the quadrant plate 22.

As in the case of the embodiment shown in Figs. 1, 2 and 3, a screw 33a is arranged so that the inner end thereof extends into a slot or groove 34a in the side of the latch 28a to prevent the latch 28a from falling out of the handle when the handle 12 is off the brake valve. At the same time, the slot 34a is sufficiently long not to interfere with the free movement of the latch 28 when assembled in the handle and associated with the quadrant plate on the brake valve.

A second modification of the embodiment shown in Figs. 1, 2 and 3 is shown in Fig. 5. In this modification, the feeler buttons 25 serve to effect retraction of the sleeve 15, the trigger 23 being omitted. At the same time, as in the embodiment shown in Figs. 1, 2 and 3, sleeve 15 engages the enlarged head 29 of the latch 28 so that the latch 28 is yieldingly urged into contact with the edge of the quadrant plate 22 by the spring 18 through the medium of the sleeve 15.

Instead of a short screw, corresponding to the screws 33 or 33a, a long screw 33b is provided which extends transversely through the body of the brake valve handle 12 and through aligned slots or elongated openings 41 and 42 in the latch 28 and sleeve 15, respectively. The screw 33b is engageable by the sleeve member 15 and acts as a stop to prevent the movement of the sleeve member 15 outwardly of the handle under the influence of the biasing spring 18, thus relieving the connecting pin 39 of the feeler buttons 25 of the shearing stresses thereon which would otherwise occur. At the same time, the screw 33b prevents dropping of the latch 28 out of the brake valve handle assembly when the brake valve handle 12 is off the brake valve.

It will be apparent that, normally, the lug 19 on the sleeve member 15 in Figs. 4 and 5 prevents operation of the brake valve handle beyond running position to release position. If, however, the operator under certain circumstances desires to shift the brake valve handle to release position he may do so after first grasping the feeler buttons and retracting the sleeve member 15. As in the case of the embodiment shown in Figs. 1, 2 and 3, upon return of the brake valve handle from release to running position, the spring 18 snaps the sleeve member 15 outwardly to its normal position so as to prevent subsequent operation of the brake valve handle to release position unless the operator again positively withdraws or retracts the sleeve member 15.

*Embodiment shown in Fig. 6*

The embodiment of my invention shown in Fig. 6 comprises a brake valve handle 12a which differs from the previous embodiment in having a bore or slot 45 therein for directly receiving a plunger-like latch 28c, a biasing spring 18 being interposed between the latch 28c and the end of the slot 45 in the handle 12a to yieldingly urge the latch 28c into contact with the edge of the quadrant plate 22. In this embodiment, the feeler buttons 25 are fixed on opposite sides of the latch 28c, the connecting pin 39 thereof extending through suitable slots 26 in the body of the brake valve handle to permit movement of the latch 28c in the slot 45.

According to my invention, the brake valve handle 12a is further provided with a slidable element 48 adapted to be fixed to the side of the brake valve handle by means of a thumb screw 49 which extends through a slotted opening 51 in the element 48 and is screwed into a tapped bore 50 in the body of the brake valve handle 12a. In order to prevent turning of the element 48 on the screw 49, the element 48 is provided with a slot or groove 52 into which a small pin 53 fixed in the side of the brake valve handle extends.

In operation, if it is desired to prevent operation of the brake valve handle beyond running position toward and into release position, the thumb screw 49 is loosened and the element 48 is shifted in the right-hand direction, as viewed in Fig. 6, until stopped by the screw 49, after which the screw 49 is tightened to hold the element 48 in position. In this position, the inner end of the element 48 engages the stop shoulder 21 on the quadrant plate 22 of the brake valve and thus effectively and positively prevents shifting of the brake valve handle beyond the normal running position in which it is shown.

If it is desired to shift the brake valve handle to release position, the operator loosens the thumb screw 49 and then by exerting sufficient force on the brake valve handle may force it from running position to release position, the contacting surfaces on the element 48 and the shoulder 21 of the quadrant plate 22 coacting to cause the element 48 to be shifted in the left-hand direction to free the brake valve handle for movement to release position.

In Fig. 7 a modified construction of the embodiment shown in Fig. 6 is indicated. In this modification, an element 48a corresponding to the element 48 of Fig. 6 is slidably received in a slot or groove 55 opening out of the slot 45 in the brake valve handle 12a and is movable by the operator to different positions against the yielding resistance of a clutch device 56. The clutch device comprises a screw 57 which is screwed into the element 48a and extends through a suitable elongated slot or opening 58 in the body of the brake valve handle 12a, and a coil spring 59 interposed between the head of the screw and a cup-shaped collar 61 slidable on the shank of the screw 57. The spring 59 acts to urge the screw outwardly to hold the element 48 in positions by the friction between the element 48 and the body of the brake valve handle 12a.

With the element 48a in its outer position as shown, the movement of the brake valve handle 12a from the running position, in which it is shown, to release position is prevented. If the operator desires to move the brake valve handle from running position to release position, he merely exerts a force on the collar 61, which is formed as a handle, to retract the element 48 against the friction between the element 48 and the body of the brake valve caused by the force of the spring 59. When the moving force on the handle 61 is relieved the spring 59 acts to maintain the element 48a in its retracted position so as to permit the brake valve handle 12a to be shifted from its running position to release position.

*Embodiment shown in Figs. 8 and 9*

Referring to Figs. 8 and 9, another embodiment of my invention is shown comprising a brake valve handle 12b having two relatively movable portions 64 and 65, the portion 64 being that part of the brake valve handle grasped by the hand of the operator and the portion 65 being that portion which is secured to the operating stem or shaft 13 of rotary valve of the brake valve. The portion 65 of the brake valve handle is provided with a slot 66 for receiving a latch 28d corresponding to the other latches previously referred to and which engages in the notches 31 in the quadrant plate 22 of the brake valve.

The latch 28d is threaded at the outer end thereof and screwed into a suitable bore in the portion 64 of the brake valve handle. Intermediate the ends of the latch 28d are feeler buttons 25 the connecting pin 39 of which extends through the latch 28d and registering slots 26 in the portion 65 of the brake valve handle.

A coil spring 68 concentrically surrounds the latch 28d and is interposed between the outer end of the brake valve handle portion 65 and the transversely extending pin 39 connecting the feeler buttons 25 to urge the latch element 28d outwardly into contact with the quadrant plate 22 and at the same time urge the portion 64 of the brake valve handle toward the portion 65. The engagement of the portion 64 of the brake valve handle with the portion 65 limits the movement of the latch 28d in the direction of the quadrant plate 22.

In Fig. 8, the brake valve handle 12b is shown in running position, wherein the latch 28d engages in the corresponding notch 31 in the quadrant plate 22 with the portion 64 of the brake valve handle engaging the portion 65.

According to my invention, the portion 65 of the brake valve handle is formed with a laterally extending slot or groove 71 opening out of the slot 66 and having therein a blocking element 72 pivoted, as on a pin 73.

The pivoted element 72 has a downwardly extending tooth or lug 74 which engages the side of the latch 28d and maintains the pivoted element 72 in an outer position such that the end of the element 72 engages the shoulder 21 on the quadrant plate 22 to prevent shifting of the brake valve handle 12b from the running position, in which it is shown, toward release position.

In order to permit movement of the brake valve handle 12b to release position, the latch 28d is provided with a slot or opening 76 therein which is in line with the tooth 74 on the pivoted element 72 but spaced therefrom normally. When the latch 28d is retracted by the operator grasping the portion 64 of the brake valve handle and pulling outwardly, the opening 76 registers with the tooth 74 on the pivoted element 72 and thus the operator may shift the brake valve handle 12b beyond running position to release position, as shown in Fig. 9.

A groove or recess 77 is provided in the portion 65 of the brake valve handle to receive the end of the tooth 74 of the pivoted element 72 and thereby permit the brake valve handle to be shifted fully into its release position.

This embodiment of my invention differs from the previously described embodiments in that the operator must continue to exert a force to hold the brake valve handle 12b in release position because if the operator removes his hand from the portion 64 of the brake valve handle, the spring 68 exerts a force on the latch 28d which automatically shifts the pivoted element 72 back to its position shown in Fig. 8, and thus, incidentally returns the brake valve handle to running position.

A modification of the embodiment shown in Figs. 8 and 9 is indicated in Fig. 10. In this modification, the pivoted element 72 of the embodiment shown in Figs. 8 and 9 is omitted and a corresponding element 78 provided. The element 78 is pivoted at one end, as by a pin 79, on the portion 65a of the brake valve handle, corresponding to the portion 65 of the brake valve handle 12b, and extends through the opening 76 in the latch 28d.

When the spring 68 urges the latch 28d outwardly into engagement with the quadrant plate 22, the free end of the pivoted element 78 is shifted to a position such as to engage the shoulder 21 on the quadrant plate 22 and thus prevent movement of the brake valve handle 12b beyond running position, in which it is shown in Fig. 10, to release position.

In order to enable the operator to shift the brake valve handle to release position, it is necessary that he pull on the portion 64 of the brake valve handle to retract the latch 28d and thus shift the pivoted element 78 outwardly out of line with the shoulder 21 on the quadrant plate 22.

In the modification shown in Fig. 10, the latch 28d engages the shoulder 21 on the quadrant plate 22 to prevent movement of the brake valve handle beyond release position.

As distinguished from the embodiment shown in Figs. 8 and 9, the brake valve handle 12b in Fig. 10 is adapted to remain in release position notwithstanding the removal of the operator's hand from the brake valve handle. It will be apparent that with the brake valve handle shifted into release position, and the outer portion 64 of the brake valve handle released by the operator, the spring 68 acts to shift the pivoted element 78 back to its normal position. However, the element 78 engages the outer edge of the quadrant plate and cannot return to its original position and thus the spring 68 acts to hold the brake valve handle yieldingly in release position. When force is exerted sufficiently to overcome the friction of the element 78 on the edge of the quadrant plate, the brake valve handle may be returned from release position to running position. Upon the return of the brake valve handle from release position to running position, the pivoted element 78 is snapped back to its original position, as shown in Fig. 10, and is thus again conditioned to prevent movement of the brake valve handle beyond running position toward release position unless retracted in the manner previously described.

*Summary*

Summarizing, it will be seen that I have disclosed various embodiments of my invention for converting automatic brake valves to prevent, positively or optionally, movement of the brake valve handle beyond normal or running position toward and into release position. In all of the embodiments, movement of the brake valve handle beyond a normal or running position toward release position is positively prevented unless the operator performs some additional act or exerts an additional effort, which he would not do ordinarily unless definitely intended, to cause the brake valve handle to be shifted to release position.

While I have disclosed only certain embodiments of my invention, it will be apparent that various omissions, additions or modifications may be made in the embodiments shown without departing from the spirit of my invention. It is not my intention, therefore, to limit the scope of my invention except as it is necessitated by the scope of the prior art.

Having now described my invention, what I claim as new and desire to secure by Letters Patent is:

1. In a brake valve device having a rotary valve element and a quadrant plate, an operating handle for shifting the valve element to different operating positions, an element movably mounted on the said handle, resilient means urging said element to a position for cooperating with the quadrant plate to prevent movement of the operating handle in one direction out of a certain operating position, and a latch element carried by the last said element and arranged to be subject to the force of said resilient means urging it yieldingly into cooperation with the quadrant plate to define the various operating positions of the handle.

2. In a brake valve device having a rotary valve element and a quadrant plate, an operating handle for shifting the valve element to different operating positions, an element movably mounted on the said handle, resilient means urging said element to a position for cooperating with the quadrant plate to prevent movement of the operating handle in one direction out of a certain operating position, a latch element carried by the last said element and arranged to be subject to force of said resilient means urging it into contact with the quadrant plate to define the various operating positions of the handle, and means under the control of the operator for shifting said element to a different position wherein it is non-effective to prevent movement of the operating handle in the said one direction out of the said certain position.

3. An operating handle for a brake valve device, comprising means movably carried on the handle and effective in one position in cooperation with a stationary part of the brake valve device to block movement of the handle to a certain operating position, a latch element carried by the blocking element and movable therewith, means for shifting the said blocking element to render it non-effective to prevent movement of the operating handle to said certain position, and means effective to limit the degree of movement of said latch element with the blocking element when the said blocking element is shifted to non-effective position, to render the latch element effective to cooperate with a stationary part of the brake valve device to prevent movement of the operating handle beyond the said certain position.

4. An operating handle for a control device, comprising a movable element carried on the handle and effective in one position in cooperation with a stationary part of the control device to block movement of the operating handle to a certain position and non-effective in a different position to block movement of the handle to said certain position, a latch element carried by said blocking element for cooperating with a stationary part of the control device to define a plurality of operating positions for the handle, and means for limiting the degree of relative movement between the latch element and the said handle.

5. In a brake valve device having a rotary valve element and a stationary quadrant plate, an operating handle for shifting the rotary valve element rotarily to different operating positions, an element carried on the handle and movable to different positions relative thereto, resilient means urging said element normally to a position for cooperating with the quadrant plate of the brake valve device to prevent movement of the operating handle in one direction beyond a certain position, a latch element carried by the said element and movable therewith, said latch element being subject to the force of said resilient means acting on the said element and thereby urged yieldingly into cooperative relation with the quadrant plate, and a feeler button carried by the said element adapted to be moved to shift the said element to a position in which it is non-effective to prevent movement of the operating handle in said one direction beyond the said certain position.

6. In a brake valve device having a rotary valve element and a stationary quadrant plate, an operating handle for shifting the rotary valve element rotarily to different operating positions, an element carried on the handle and movable relative thereto, resilient means yieldingly urging the said element to a position in which it cooperates with the quadrant plate of the brake valve device to block the movement of the operating handle in one direction beyond a certain position, means movable to a limited degree relative to the handle for shifting said element against the force of said resilient means to a position rendering it non-effective to block movement of the handle beyond said certain position in said one direction, and a latch element carried by the blocking element and subject to the force of said resilient means urging it into cooperating contact with the quadrant plate to define the different operating positions of the handle.

7. In a brake valve device having a rotary valve element and a stationary quadrant plate, an operating handle for shifting the rotary valve element rotarily to different operating positions, an element carried on the handle and movable relative thereto, resilient means yieldingly urging the said element to a position in which it cooperates with the quadrant plate of the brake valve device to block the movement of the operating handle in one direction beyond a certain position, means on said element graspable by an operator and movable to a limited degree relative to the handle for shifting said element against the force of said resilient means to a position rendering it non-effective to block movement of the handle beyond said certain position in said one direction, a latch element carried by the blocking element and arranged to be subject to the force of said resilient means and urged thereby into cooperating contact with the quadrant plate, and means for preventing more than a limited degree of movement of the said latch element relative to the said handle.

8. In a brake valve device having a rotary valve element and a stationary quadrant plate, an operating handle for shifting the valve element rotarily to different operating positions, an element carried on the handle and movable relative thereto, resilient means yieldingly urging the said element to a normal position in which it cooperates with the quadrant plate of the brake valve device to prevent movement of the operating handle in one direction beyond a certain position, means for shifting the said element out of its normal position against the force of the resilient means to a different position in which it is non-effective to prevent the movement of the operating handle in the said direction beyond the certain position, and optional means carried by the handle adapted to cooperate with the said element to prevent shifting thereof by the last said means out of its normal position to its non-effective position.

9. In a brake valve device having a rotary valve element and a stationary quadrant plate, an operating handle for shifting the valve element rotarily to different operating positions, an element carried on the handle and movable relative thereto, resilient means yieldingly urging the said element to a normal position in which it cooperates with the quadrant plate of the brake valve device to prevent movement of the operating handle in one direction beyond a certain position, means for shifting the said element out of its normal position against the force of the resilient means to a different position in which it is non-effective to prevent the movement of the operating handle in the said direction beyond the certain position, optional means carried by the handle adapted to cooperate with the said element to prevent shifting thereof by the last said means out of its normal position to its non-effective position, a latch element carried by the said element and so constructed and arranged as to be yieldingly urged into cooperative contact with the quadrant plate by the said resilient means, and means for preventing more than a limited degree of movement of the latch element relative to the said handle.

10. An operating handle for a brake valve device, comprising an element carried thereon and movable relative thereto, and means for securing said element against movement relative to the handle in different positions, in one of which the element cooperates with a fixed part of the brake valve device to block movement of the handle in one direction beyond a certain position and in another of which it is non-effective to block movement of the handle in the said one direction beyond said certain position.

11. An operating handle for a brake valve device, comprising an element carried thereon and movable relative thereto, and means for clamping the said element to the handle in different positions relative to the handle, in one of which positions the element cooperates with a fixed part of the brake valve device to block movement of the operating handle in one direction beyond a certain position and in another of which it is non-effective to block movement of the handle in the said one direction beyond the said certain position.

12. In a brake valve device having a rotary valve element and a stationary quadrant plate, a handle for rotarily shifting the valve element to different operating positions, said handle having two portions one of which carries a latch element, resilient means yieldingly urging the latch element into cooperative relation with the quadrant plate of the brake valve device and effective to yieldingly resist movement of the said one portion of the handle relative to the other, an element pivoted on the said other portion of the handle and normally maintained in a position by said latch element to cooperatively engage the quadrant plate and thereby block movement of the handle in one direction beyond a certain position, said element being shiftable out of its normal position, to permit movement of said handle in said one direction beyond said certain position, upon movement of the one portion of the handle relative to the other.

13. In a brake valve device having a rotary valve element and a stationary quadrant plate, an operating handle for rotarily shifting the valve element to different operating positions, said handle having two portions one of which is movable relative to the other, a latch element carried by the said one portion of the handle, resilient means yieldingly urging the latch element into cooperative engagement with the quadrant plate and effective to yieldingly resist movement of the one portion of the handle relative to the other portion, a blocking element pivoted on the other portion of the said handle and pivotally moved to different positions upon movement of the latch element, said latch element being normally effective to maintain the pivoted blocking element in a position so as to cooperatively engage the quadrant plate and block movement of the handle in one direction beyond a certain position and shifted by movement of the one portion of the handle relative to the other to pivotally move the blocking element to a position wherein it is non-effective to block movement of the handle in the said one direction beyond said certain position.

14. An operating handle for a valve device of the type having a rotary valve and a stationary quadrant plate on the periphery of which are a series of successively spaced notches located respectively in positions corresponding to the different operating positions of the rotary valve and a projecting shoulder located beyond and in spaced relation to the end notch of the series in one direction and defining a yet different operating position, said handle comprising a body member graspable by the hand of the operator for turning the rotary valve to its different operating positions, a latch member carried on and movable with respect to the said body member, resilient means yieldingly urging the said latch member in a direction to engage in the notches of the quadrant plate, and an element carried on and movable to different positions with respect to the said body member, said element being effective in one of its positions to engage the shoulder on the quadrant plate substantially at the time that the latch member engages in the said end notch adjacent said shoulder for preventing movement of the body member past the position thereof corresponding to that of said end notch in the direction of said shoulder and effective in another of its positions to permit movement of the body member past the position corresponding to that of the said end notch and to said yet different operating position where the said latch member engages said shoulder.

CLYDE C. FARMER.